United States Patent [19]

Stevens et al.

[11] Patent Number: 5,628,916

[45] Date of Patent: May 13, 1997

[54] METHOD FOR FILTERING EDIBLE OILS

[75] Inventors: Donald B. Stevens, Port Washington; Leonard R. Castellano, Great Neck; Thomas C. Gsell, Glen Head; Jeffrey M. Seibert, Cortland; Barry J. Weissman, Bayville, all of N.Y.

[73] Assignee: Pall Corporation, East Hills, N.Y.

[21] Appl. No.: 555,803

[22] Filed: Nov. 9, 1995

Related U.S. Application Data

[63] Continuation of Ser. No. 291,453, Aug. 17, 1994, abandoned.

[51] Int. Cl.⁶ .......................... B01D 37/00; B01D 25/32
[52] U.S. Cl. .......................... 210/798; 210/799; 210/805; 210/806
[58] Field of Search .......................... 210/791, 797, 210/798, 799, 805, 806

[56] References Cited

U.S. PATENT DOCUMENTS

| | | | |
|---|---|---|---|
| 2,654,440 | 10/1953 | Robinson . | |
| 2,935,499 | 5/1960 | Albright et al. . | |
| 3,157,131 | 11/1964 | Brydon | 103/220 |
| 3,396,847 | 8/1968 | Englesberg | 210/85 |
| 3,414,129 | 12/1968 | Going et al. | 210/798 |
| 3,477,582 | 11/1969 | Baldwin . | |
| 3,648,844 | 3/1972 | Krynski et al. . | |
| 4,226,742 | 10/1980 | Bearden, Jr. et al. . | |
| 4,232,087 | 11/1980 | Trask | 210/508 |
| 4,240,908 | 12/1980 | Swain et al. | 210/799 |
| 4,362,630 | 12/1982 | Young | 210/799 |
| 4,414,401 | 11/1983 | Wintermeyer et al. . | |
| 4,525,267 | 6/1985 | Inooka . | |
| 4,594,202 | 6/1986 | Pall et al. . | |
| 4,647,369 | 3/1987 | Kam et al. . | |
| 4,726,901 | 2/1988 | Pall et al. . | |
| 4,822,692 | 4/1989 | Koehler . | |
| 4,892,658 | 1/1990 | Martin et al. | 210/614 |
| 5,017,241 | 5/1991 | Ryan | 210/791 |
| 5,074,989 | 12/1991 | Sigaud et al. . | |
| 5,110,954 | 5/1992 | Bellis . | |
| 5,114,596 | 5/1992 | Laterra | 210/798 |
| 5,160,444 | 11/1992 | McFarland | 210/806 |
| 5,174,907 | 12/1992 | Chown et al. | 210/799 |
| 5,271,850 | 12/1993 | Stutzman | 210/437 |
| 5,290,446 | 3/1994 | Degen et al. . | |

FOREIGN PATENT DOCUMENTS

| | | |
|---|---|---|
| 0109169 | 5/1984 | European Pat. Off. . |
| 0148638 | 7/1985 | European Pat. Off. . |
| 0216711 | 4/1987 | European Pat. Off. . |
| 2603276 | 3/1988 | France . |
| 49-117423 | 11/1974 | Japan . |
| 55-51439 | 4/1980 | Japan . |
| 63-83031 | 4/1988 | Japan . |
| 856331 | 12/1960 | United Kingdom . |

(List continued on next page.)

OTHER PUBLICATIONS

"Pall Backwash Filter Systems for Solid/Liquid Separation"; Pall Corporation, 1993.
"Prosep™ Filters Automated Filtration Systems Technology"; Pall Corporation, 1993.
"FUNDA® The Filter"; Chemap, Inc.

*Primary Examiner*—Peter A. Hruskoci
*Assistant Examiner*—Theodore M. Green
*Attorney, Agent, or Firm*—Leydig, Voit & Mayer

[57] ABSTRACT

A method for filtering edible oils utilizing a backwashable filter assembly. A filter system having at least two filter assemblies may be utilized to remove bleaching clay and/or nickel catalyst from oil being processed for human consumption. The filter assemblies may be connected in a series and tandem manner to provide continuous and uninterrupted filtering of the edible oil. Each filter assembly preferably comprises multiple, substantially cylindrical filter elements having a porous filter medium which may be formed from polyaramid fibers. The filter elements are designed to withstand the elevated temperatures used in edible oil processing and for ease of cleaning during backwashing.

25 Claims, 6 Drawing Sheets

FOREIGN PATENT DOCUMENTS

| | | |
|---|---|---|
| 1096260 | 12/1967 | United Kingdom . |
| 1407932 | 3/1974 | United Kingdom . |
| 2152471 | 8/1985 | United Kingdom . |
| 2153246 | 8/1985 | United Kingdom . |
| 2239401 | 7/1991 | United Kingdom . |
| 2269114 | 2/1994 | United Kingdom . |
| 9303816 | 3/1993 | WIPO . |
| WO94/11082 | 11/1993 | WIPO . |

METHOD FOR FILTERING EDIBLE OILS

This application is a continuation of Ser. No. 08/291,453 filed Aug. 17, 1994 abandoned.

BACKGROUND OF THE INVENTION

1. Field of the Invention

The present invention relates to a method for filtering edible oils, and more particularly, to a method for filtering edible oils utilizing a backwashable filter assembly.

2. Discussion of the Prior Art

The processing of oil for human consumption is a multistep procedure which may include bleaching and hydrogenation. Generally, oils are hydrogenated and bleached in sequential operations. The edible oil is bleached by passing the oil through a bleaching clay such as acid activated calcium bentonite to stabilize the oil and to decolorize the oil in order to prevent oxidation and achieve a clear amber hue to the oil. The edible oil is hydrogenated by reacting the oil with hydrogen in the presence of a catalyst, such as a nickel powder catalyst, to alter the melting point such that the edible oil will solidify at low temperatures, e.g., room temperature. Hydrogenation is not performed for all the edible oils, but rather just those that are intended to be solid at low temperatures. The bleaching and hydrogenation of the edible oils results in the edible oil containing solid particulate matter in the form of bleaching clay and nickel catalyst which must be removed from the edible oil before consumption.

The filtering of edible oils which have been bleached and/or hydrogenated as part of a processing procedure is currently accomplished by pressure leaf filter assemblies having a diatomaceous earth precoat. An exemplary pressure leaf filter assembly, as particularly described in U.S. Pat. No. 3,648,844, comprises a tank containing a stack of closely spaced, generally disk-shaped leaf filters mounted along a central conduit. Each leaf filter may include a plate having two oppositely disposed faces. Porous media are mounted on both faces of the plate, and the plate has passages which communicate between the porous media and the central conduit.

Before the edible oil is introduced into the tank of the leaf filter assembly, a slurry of a precoat material, such as diatomaceous earth, in a liquid is directed into the tank. The liquid passes through the porous media along the passages in the plate to the central conduit and exits the leaf filter assembly via the central conduit. As the liquid passes through the porous media, the precoat material is deposited on the porous media, forming a layer of precoat material on each face of each leaf filter.

Once a sufficient layer of precoat material is deposited on each leaf filter, the flow of slurry into the tank may be terminated and the edible oil containing the particles of nickel catalyst and bleaching clay is introduced into the tank. As the edible oil flows through the precoat layers of each leaf filter, the particles of nickel catalyst and bleaching clay are trapped in the precoat layer. The filtered edible oil then flows through the porous media of the leaf filter along the passages in the plate to the central conduit and exits the leaf filter assembly via the central conduit.

The precoat layer eventually becomes fouled with the particles of nickel catalyst and bleaching clay which are filtered from the oil stream. Essentially, the build-up of particulate solids in the precoat increases the pressure drop across each leaf filter, thereby degrading the performance of the filter. Consequently, the flow of edible oil into the tank of the leaf filter assembly is periodically terminated and the leaf filter assembly is backwashed to remove the precoat layer and the build-up of particulate solids trapped in the precoat layer. Typically, a cleaning liquid, referred to as a backwash liquid, is forced at a high flow rate, pressure, and/or volume in a reverse direction through the central conduit along the passages in the plate of each leaf filter and through the porous media on each face of the plate. The backwash liquid flowing in the reverse direction to the porous medium forces the precoat layer and the particles of nickel catalyst and bleaching clay off of the porous medium and flushes them to the bottom of the tank where the backwash liquid and the solids material is removed via a drain. Once the leaf filter assembly has been backwashed, another cycle of introducing the precoat slurry into the tank to form the precoat layer, introducing the contaminated edible oil into the tank to remove the particles of nickel catalyst and bleaching clay, and backwashing the fouled precoat layer is begun.

While this process of filtering edible oils through a leaf filter assembly is very effective for removing particles of nickel catalyst and bleaching clay, it nonetheless has several problems. For example, this process generates a huge amount of contaminated waste. The volume of precoat material is very large compared to the volume of nickel catalyst and bleaching clay, but all of the solids material must be properly disposed of once it is flushed down the drain of the leaf filter assembly. Further, once the spent precoat layer has been backwashed from the leaf filters, a new precoat layer must again be deposited on each face of each leaf filter. This is a time consuming portion of the cycle which detracts from the overall efficiency of the process since none of the edible oil is being filtered while the precoat layer is being deposited. In addition, because the leaf filters are closely spaced to one another it is difficult to remove all of the precoat from each leaf filter, especially in the area of the leaf filters near the central conduit.

In an alternate design, the leaf filters are stacked on a rotatable hollow shaft. Once the precoat layer on the leaf filters becomes fouled, filtration may be suspended and the shaft is rotated to remove the caked on particulate matter. The shaft is rotated at a speed sufficient to generate a centrifugal force which causes the caked on matter to fly off the leaf filters. Accordingly, as with the backwashing method described above, the rotation not only serves to remove the caked on matter, but also the diatomaceous precoat as well.

In accordance with one aspect, the present invention is directed to a method for filtering edible oils. The method of filtering edible oils comprises passing edible oil containing solid particulate matter into a backwashable filter assembly, removing the solid particulate matter from the edible oil by directing the edible oil through a fiber filter medium having a graded pore structure, including passing the edible oil through a coarser pore upstream region and then a finer pore downstream region of at least one substantially cylindrical filter element contained within the backwashable filter assembly and accumulating the solid particulate matter directly on the at least one substantially cylindrical filter element. The method of filtering edible oils also comprises backwashing the at least one substantially cylindrical filter element after the cake of solid particulate matter accumulates on the at least one substantially cylindrical filter element by directing a backwash fluid through the fibrous filter medium having a graded pore structure, including passing the backwash fluid through the finer pore downstream region and then the coarser pore upstream region, to clean the at least one substantially cylindrical filter element having the solid particulate matter removed from the edible oil accumulated thereon. The method also includes cyclically alternating between removing the solid particulate matter from the edible oil by passing the edible oil through the at least one substantially cylindrical filter element and backwashing the at least one substantially cylindrical filter element to clean the at least one substantially cylindrical filter element having solid particulate matter accumulated thereon.

In accordance with another aspect, the present invention is directed to a method for filtering edible oils. The method comprises passing a fluid containing solid particulate matter into a first backwashable filter assembly and into a second backwashable filter assembly, removing the solid particulate matter from the fluid by directing the fluid through at least one filter element in the first backwashable filter assembly, including accumulating a cake of solid particulate matter on the at least one filter element in the first backwashable filter assembly, and through at least one filter element in the second backwashable filter assembly, including accumulating a cake of the solid particulate matter on the at least one filter element in the second backwashable filter assembly. The at least one filter element in the first backwashable filter assembly and the at least one filter element of the second backwashable filter assembly comprise a fibrous filter medium having a graded pore structure. The edible oil is passed through a coarser pore upstream region and then a finer downstream region. The method also comprises backwashing the at least one filter element in the first backwashable filter assembly after the cake of solid particulate matter is formed on the at least one filter element of the second backwashable filter assembly, and backwashing the at least one filter element in the second backwashable filter assembly after the cake of solid particulate matter is formed on the at least one filter element of the first backwashable filter assembly.

In accordance with another aspect, the present invention is directed to a method of filtering edible oil fluids. The method of filtering edible oil fluids comprises passing an edible oil fluid containing solid particulate matter into an inlet of a first backwashable filter assembly, removing the solid particulate matter from the fluid by directing the fluid through the at least one filter element in the first backwashable filter assembly, including building a cake of the solid particulate matter on the at least one filter element in the first backwashable filter assembly, discontinuing passing of the fluid containing solid particulate matter into the inlet of the first backwashable filter assembly, passing the fluid containing solid particulate matter into an inlet of a second backwashable filter assembly through an outlet of the second backwashable filter assembly and into the inlet of the first backwashable filter assembly, removing the solid particulate matter from the fluid by directing the fluid through the at least one filter element in the second backwashable filter assembly, including accumulating a cake of the solid particulate matter on the at least one filter element in the second backwashable filter assembly and through the at least one filter element in the first backwashable filter assembly, and through the cake of the solid particulate matter on the at least one filter element in the first backwashable filter assembly, and finally discontinuing passing the fluid from the outlet of the second backwashable filter assembly to the inlet of the first backwashable filter assembly. The method also comprises backwashing the at least one filter element in the first backwashable filter assembly, discontinuing passing of the fluid containing solid particulate matter into the inlet of the second backwashable filter assembly, passing the fluid containing solid particulate matter into an inlet of the first backwashable filter assembly through the outlet of the first backwashable filter assembly and into the inlet of the second backwashable filter assembly, removing the solid particulate matter from the fluid by directing the fluid through the at least one filter element in the first backwashable filter assembly, including accumulating a cake of the solid particulate matter on the at least one filter element in the first backwashable filter assembly, and through the at least one filter element in the second backwashable filter assembly, including accumulating a cake of the solid particulate matter on the at least one filter element in the second backwashable filter assembly, discontinuing passing the fluid from the outlet of the first backwashable filter assembly, and backwashing the at least one filter element in the second backwashable filter assembly.

SUMMARY OF THE INVENTION

The present invention is directed to a method for filtering edible oils. The method comprises passing processed edible oils containing solid particulate matter into a backwashable filter assembly. In the backwashable filter assembly, solid particulate matter contained in the edible oil is removed therefrom by directing the edible oil through at least one substantially cylindrical filter element contained within the backwashable filter assembly. The solid particulate matter accumulates directly on the filter element and forms a cake thereon. After a predetermined period of filtration time, the filter element is backwashed to clean the filter element and remove the solid particulate matter collected thereon. The backwashable filter system cylically alternates between removing the solid particulate matter and backwashing of the filter element.

The present invention is also directed to a filter assembly and a filter system which provide for a simple and effective procedure for removing particulate matter such as bleaching clay, e.g., acid activated calcium bentonite and nickel catalyst from oils processed for human consumption. Accordingly, the backwashable, edible oil filter assembly or system of the present invention is utilized to remove the unwanted solids from the edible oil in a safe and efficient manner.

The backwashable, edible oil filter assembly may comprise multiple hollow, cylindrical filter elements which may be backwashed. Additionally, the multiple filter elements have a porous filter medium, and preferably a microporous filter medium, which requires no precoating to remove the unwanted solid materials contained in the edible oil. The porous filter medium is preferably formed from a polyaramid fibrous material which is chosen because of its ability to withstand the relatively high temperatures involved in the processing of the edible oils. The porous filter medium may have a variable pore size construction, e.g., a coarser outer layer and a finer inner layer. This design efficiently collects solids directly on the filter element, where the solids form a permeable cake during the filtration procedure. During the backwash cycle of operation, a reverse flow is initiated, thereby discharging the collected solids from the filter elements. Upon completion of the backwash cycle, the filter assembly is returned to full forward flow for normal filtration of the edible oil.

The filter system comprises a series and tandem arrangement of filter assemblies and provides for the continuous, uninterrupted, and highly efficient filtration of the edible oil.

The size of the particulate matter, especially of the nickel catalyst, is extremely small. If the removal rating of the filter elements is not sufficiently fine to remove all of the particulate matter, the edible oil may not be sufficiently filtered by a clean filter element. Accordingly, the filter system provides a series and tandem arrangement of first and second filter assemblies to effectively remove the particulate matter, including the nickel catalyst. Once a filter assembly completes the backwash cycle of operation, its filter elements are clean. The flow of edible oil to be filtered is directed to this clean filter assembly wherein the edible oil may not be completely filtered; therefore, the filtrate exiting from this first filter assembly is directed to the second filter assembly, which is currently waiting to enter the backwash cycle of operation and therefore, has a cake buildup on the filter elements. The cake of particulate matter supplements the filtration action of the filter element, ensuring substantially complete removal of the particulate matter. Thus, any remaining nickel catalyst particles are removed in this second filter assembly. After a given period of time, a cake of particulate matter builds up directly on the filter elements of the first filter assembly, and these caked filter elements are sufficient to remove all the particulate matter from the edible oil without passing the oil through the caked filter elements of the second filter assembly. The second filter assembly is then switched into the backwash cycle of operation for cleaning while the first filter assembly is used to filter the oil. The entire process is cyclic and provides for continuous and uninterrupted operation.

The backwashable, edible oil filter system of the present invention provides for a faster, longer lasting, and more economical procedure for filtering oils for human consumption. The procedure is faster, i.e., higher process rates are achievable, because there is no down-time associated with a precoat operation. Filter assemblies embodying the present invention effectively filter the edible oil without the need for a precoat. Further, the filter assembly, including the filter elements, are longer lasting because of the substantially cylindrical shape and the surface morphology of the porous filter medium which allow for complete backwash cleaning of the filter elements while remaining structurally intact over the course of a multiplicity of filter/backwash cycles. Methods, assemblies, and systems embodying the invention are more economical for a variety of reasons. The filter assembly is a self-cleaning unit; therefore, no replacement filter elements are necessary. There is little or no system down time. Maintenance personnel are not required on a regular basis to clean the filter assemblies. Since the filter elements do not require a precoat layer, no time or money is expended on the precoat or its application. In addition, the compact size of the filter assembly minimizes product hold-up, backwash fluid volume, space requirements and installation costs.

The filter assembly and backwashing method embodying the present invention are highly efficient in that they provide for substantially reducing waste and cost while increasing process rates. In prior art systems, precoating of the filter elements is required to effectively remove particulate matter. Accordingly, during backwash cycles, the precoat material is removed from the filter elements along with the collected particulate matter. In addition to the cost associated with replacing the precoat, the amount of waste vastly increases due to the presence of the precoat. Since the filter elements of the present invention do not require a precoat, waste is greatly reduced.

The backwashable, edible oil filter assembly of the present invention utilizes high strength and high durability filter elements which are able to withstand the elevated temperatures of edible oil processing and the cyclic loads applied during reverse flow cleaning cycles. The filter assembly ensures high efficiency operation leading to improved product quality, maximization of solids recovery and protection of system operators, equipment and the environment. The filter assembly may be utilized over a wide array of filtering applications.

DESCRIPTION OF THE PREFERRED EMBODIMENTS

Figure 1:
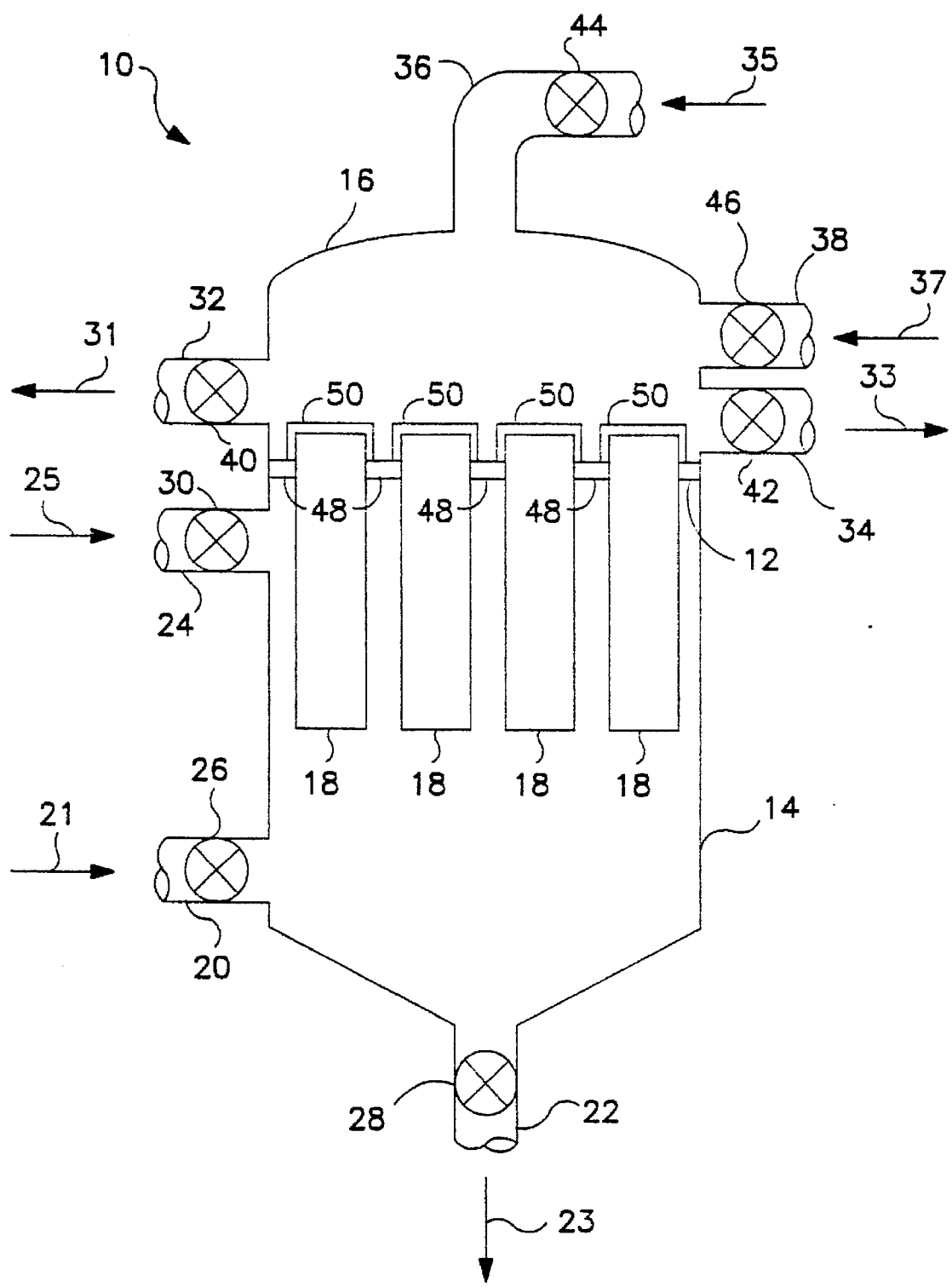
FIG. 1 is a cross-sectional view of the backwashable, edible oil filter assembly of the present invention.

The processing of oils for human consumption typically encompasses a multi-stage procedure including bleaching of the oil and hydrogenation of the oil. Although neither bleaching nor hydrogenation is absolutely necessary, both are frequently utilized. The oil is bleached by passing the oil through a bleaching clay to stabilize the oil and to decolorize the oil in order to prevent oxidation and to create a clear amber oil, while the oil is hydrogenated to alter the melting point such that the oil will solidify at low temperature. Hydrogenation, therefore, is not performed for all edible oils, but rather those that are intended to be solid at low temperatures, such as room temperature.

The bleaching of oil is a relatively simple procedure wherein the oil is heated to a predetermined temperature within a given temperature range and mixed with a bleaching clay, such as acid activated calcium bentonite in a slurry tank. The slurry of oil and bleaching clay is pumped into a vacuum bleacher where it is continuously agitated. During residence in the vacuum bleacher, coloring matters, gums, other pigments and trace elements present in the oil are adsorbed by the bleaching clay to produce a clear amber oil. Additionally, the bleaching clay serves to stabilize the oil to prevent oxidation.

The hydrogenation of the oil is also a relatively simple procedure wherein the oil is mixed with a specific catalyst, such as a nickel catalyst, in a slurry tank. Hydrogen gas is pumped into the slurry of oil and catalyst under precise control, wherein the hydrogen reacts with the oil in the presence of the catalyst to produce a hydrogenated oil with an altered melting point such that the oil solidifies at low temperatures.

As a result of bleaching and/or hydrogenation, the edible oil contains solid particles of the bleaching clay and/or nickel catalyst. The bleached and/or hydrogenated oil must then be filtered to remove these impurities.

In accordance with one aspect of the present invention, a backwash filter assembly employing hollow cylindrical filter elements having a porous filter medium are utilized to filter the edible oil without the presence of a precoat layer. The porous filter medium of each filter element is designed having pore sizes which will effectively collect particles of bleaching clay and nickel catalyst as a cake directly on the filter element, i.e., on the surface or in the pores of the filter element. This cake supplements the filtration action of the filter medium and allows the filter assembly to remove virtually all of the particles of bleaching clay and nickel catalyst without the use of a precoat. Once the cake deposits reach a certain level, however, degradation of filter performance occurs. Essentially, the buildup of solids on the filter medium inhibits flow through the filter element and/or increases the pressure drop across the filter element, thereby reducing its utility. Accordingly, the filter assembly is backwashable, allowing each filter element to be cleaned to remove the caked-on accumulated solids. A backwash filter assembly embodying the present invention provides a practical approach for effectively filtering edible oils while maintaining clean and efficient filter elements, and it is particularly advantageous in applications where the solids waste may not be conveniently released to the environment.

As is shown in FIG. 1, an exemplary backwashable edible oil filter assembly for implementing the methodology of the present invention includes a housing 10 which is divided by a partition 12, such as a tube sheet, into first and second chambers 14 and 16. At least one, and preferably a plurality of hollow, cylindrical filter elements 18 are disposed inside the first chamber 14 and are attached to the partition 12. The partition 12 is preferably impervious to the edible oil, as well as to gas, and is sealingly connected to the inner wall of the housing 10. The partition 12 may be formed from stainless steel or any other suitable material impervious to the flow of edible oil.

The arrangement illustrated in the figure may be used both for filtering edible oil by means of the filter elements 18 and for cleaning the filter elements 18 by backwashing. During normal filtering operation, processed edible oil to be filtered flows from the first chamber 14 into the second chamber 16 through the hollow, cylindrical filter elements 18, and during backwashing operation, a backwashing fluid, either filtrate or an externally supplied fluid, flows in the reverse direction from the second chamber 16 into the first chamber 14 through the filter elements 18.

The housing 10 is preferably constructed so that the filter elements 18 can be readily accessed to permit their replacement. For example, the housing 10 can include upper and lower sections detachably connected to one another. Alternatively, a sealable access port can be formed in the wall of the housing 10 to permit access to the inside of the first and/or second chambers 14, 16.

The housing 10 need not have any particular shape or size. Generally, the shape of the housing 10 and the material(s) utilized for construction thereof will be selected on strength considerations so that the housing 10 will have sufficient strength to withstand the pressures exerted on it during filtration or backwashing. Additional considerations, including the type of liquid being filtered, may effect the choice of materials. For example, the material of which the housing is constructed is preferably compatible with the fluid contained therein. Typically, the housing 10 is constructed from stainless steel. For simplicity of structure and operation, the partition 12 is disposed in the housing 10 substantially horizontally. In the illustrated exemplary embodiment, the first chamber 14 is disposed below the second chamber 16; however, the construction of the housing 10 may be reversed, i.e., the second chamber 16 may be disposed below the first chamber 14.

A plurality of pipes may be connected to the housing 10 for introducing various fluids into and removing various fluids from the housing 10. In the exemplary embodiment, an edible oil feed pipe 20 and a lower drain pipe 22 are connected to the housing 10 so as to communicate with the inside of the first chamber 14. The edible oil feed pipe 20 is used to introduce the solids laden edible oil to be filtered into the first chamber 14 from a source not shown, and the lower drain pipe 22 is used to remove unwanted materials from the first chamber 14 and also to drain the first chamber 14. Arrows 21 and 23 indicate the direction of flow through the edible oil feed pipe 20 and the lower drain pipe 22 respectively. A make-up gas feed pipe 24 may communicate with the first chamber 14 preferably just below the partition 12. The make-up gas feed pipe 24 supplies a make-up gas, such as air, to facilitate draining the first chamber 14 through the lower drain pipe 22. When the first chamber 14 is drained, a vacuum lock can occur above the fluid line, thereby impeding drainage. Accordingly, by supplying a make-up gas, the problem is alleviated. The make-up gas feed pipe 24 may also serve to vent the first chamber 14. Arrow 25 indicates the direction of flow through the make-up gas feed pipe. The edible oil feed pipe 20, the lower drain pipe 22, and the gas feed pipe 24 are equipped with corresponding control valves 26, 28, and 30 for controlling the flow through their respective pipes 20, 22, and 24. The edible oil feed valve 26, the lower drain valve 28, and the make-up gas feed valve 30 may be of any suitable valve type, such as a gate valve, and may be manually operated or automatically operated.

A filtrate discharge pipe 32, an upper drain pipe 34, a backwash liquid feed pipe 36, and a pressurized gas feed pipe 38 may be connected to the housing 10 so as to communicate with the inside of the second chamber 16. The filtrate discharge pipe 32 is used to remove filtrate, i.e., edible oil which has passed through and was filtered by the filter elements 18. The upper drain pipe 34 is used for removing unwanted materials from the second chamber 16. The backwash liquid feed pipe 36 may be used to supply a suitable backwash liquid to the second chamber 16 from any suitable source. The pressurized gas feed pipe 38 supplies the second chamber 16 with a compressed gas also from any suitable source. Arrows 31, 33, 35, and 37 indicate the direction of flow through the filtrate discharge pipe 32, the upper drain pipe 34, the backwash liquid feed pipe 36 and the pressurized gas feed pipe 38, respectively.

Each of the pipes 32, 34, 36, and 38 may be equipped with a corresponding control valve 40, 42, 44, and 46. The filtrate discharge valve 40, the upper drain valve 42, the backwash liquid feed valve 44, and the pressurized gas feed valve 46 may be of any suitable valve type such as a gate valve. The control valves 40, 42, 44, and 46 for their respective pipes can be controlled manually, or they can be automatically controlled, for example, made to operate according to a prescribed sequence by any suitable programmable control unit.

In the exemplary embodiment, each pipe 20, 22, 24, 32, 34, 36, and 38 serves a single function, but it is possible to have a single pipe serve a plurality of functions. For example, one pipe could be used both as a filtrate discharge pipe 32 and as a drain pipe 34 or one pipe could be used both as a filtrate discharge pipe 32 and as a backwash liquid feed pipe 36. It is also possible to use filtrate accumulated in the second chamber 16 as a backwash liquid, in which case the backwash liquid feed pipe 36 may be eliminated. In addition, it is possible to have more pipes than in the exemplary embodiment illustrated in FIG. 1. A second pressurized gas feed pipe may be coupled to the first chamber 14 to supply a compressed gas to the chamber 14, or a second make-up gas feed pipe may be coupled to the second chamber 16 to supply make-up gas as the filtrate is drained. Furthermore, the figure is merely a schematic representation, and the locations of the pipes 20, 22, 24, 32, 24, 26, and 38 on the housing 10 are not limited to those shown in the figure.

For each of the filter elements 18, an opening 48 which communicates between the first and second chambers 14 and 16 is formed in the partition 12. Each filter element 18 is connected at one end to the partition 12 so that fluid from the first chamber 14 can enter the opening 48 only by first passing through the filter element 18. Preferably, the filter elements 18 are detachably mounted on the partition 12 so that they can be easily replaced. A threaded mounting device 50 may be utilized to secure the filter element 18 in position. The size of the opening 48 can be selected based on fluid flow requirements during filtration. The filter elements 18 generally range in size from one inch to two inches in outside diameter; however, custom sized filter elements may also be easily utilized. In this exemplary embodiment, each filter element 18 is disposed entirely within the first chamber 14, although it is possible for the filter elements 18 to extend part way into the second chamber 16. Each filter element 18 may also be connected at the other end to a support plate, not shown, which extends across the housing 10 parallel to the partition 12. The support plate functions to secure the filter elements 18 in position, and maintain them in a substantially parallel orientation.

Figure 2:
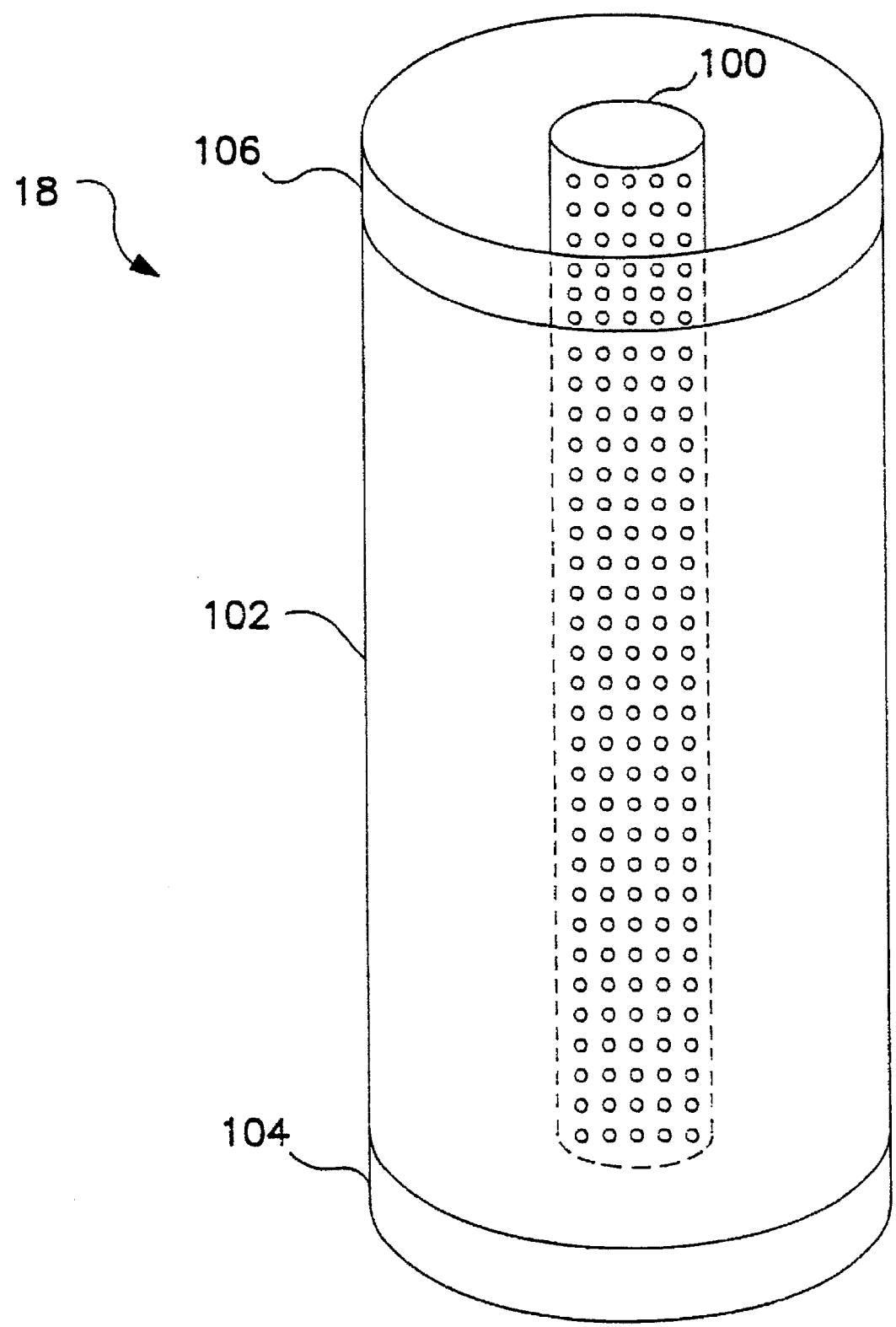
FIG. 2 is a diagrammatic representation of the filter element utilized in the backwashable, edible oil filter assembly of the present invention.

FIG. 2 illustrates an exemplary embodiment of a single hollow, cylindrical filter element 18 that is used in the backwash filter assembly of FIG. 1. The filter element 18 preferably comprises a hollow perforated core 100, a porous filter medium 102 formed around the core 100, a blind end cap 104 on a first end of the filter medium 102 and the core 100, and an open end cap 106 on a second end of the filter medium 102 and the core 100. The hollow perforated core 100, in the exemplary embodiment, is substantially cylindrically shaped and may be formed of stainless steel. Other materials may be utilized for the core 100 such as a rigid polymeric material. The core 100 provides support for the porous filter medium 102 against radially inwardly directed forces. The end caps 104 and 106 may be formed from glass fiber filled polypropylene which are thermally bonded to the porous filter medium 102 and the core 100 to provide a strong, uniform seal. Other materials may be utilized for construction of the end caps 104 and 106, including any suitable impervious metal or polymeric material. Other methods may be utilized for attaching the end caps 104 and 106 to porous filter medium 102 and the core 100, including spin or sonic welding, polycapping, or bonding by means of an adhesive or a solvent.

The filter medium 102 is preferably made of a polyaramid fiber such as a KEVLAR® fiber which is layered onto the perforated core 100. The polyaramid fiber is preferred in this application because it can withstand the higher temperatures involved in the processing of edible oils and, additionally, it can be formed in finer grades. The filter medium 102 preferably has a graded pore structure in which an upstream section of the filter medium has a different removal rating, e.g., a coarser rating, than a downstream section of the filter medium. For example, the outer section of the cylindrical filter medium may have a fiber diameter and/or pore size which increases gradually to the outermost surface of the filter medium, while the inner section has a fiber diameter and/or pore size which is constant and finer than the outer section. The upstream section may provide effective prefiltration for many solid particles and aids in quickly building a cake of particulate matter, including bleaching clay and nickel catalyst, directly on the filter element 18.

This pore size and fiber diameter variation may be achieved through a process wherein the fiber diameter is changed continuously as the fibers are deposited on the core 100 while maintaining uniform high void volume. The inner section may be formed from extremely fine fibers in order to increase the number of pores while decreasing the effective diameter of each of the pores.

Figure 3:
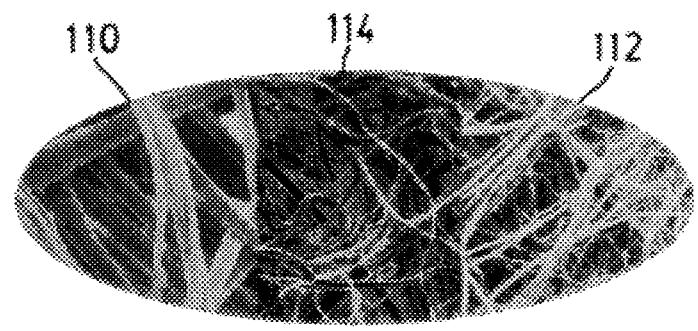
FIG. 3 is an exaggerated view of a sample section of porous filter medium utilized by the filter element of FIG. 2.

FIG. 3 illustrates an exemplary construction of a porous filter medium 102. As is illustrated in the figure, the outer or upstream section 110 of the porous filter medium 102 comprises larger fibers and larger pores. The fibers and pores which comprise the outer section 110 gradually decrease in size towards the inner or downstream section 112 of the porous filter medium 102. The outer section 110 may comprise the bulk of the porous filter medium 102 at approximately two-thirds of the thickness thereof. The region 114 of decreasing fiber diameter and pore size is part of the outer section 110. The inner section 112 is comprised of extremely small fibers forming extremely small pores. The net effect of this design is a filter element 18 which filters fluid by an efficient sieving and trapping action, and which has a high dirt capacity. In addition, this structure allows the filter element 18 to be easily cleaned during backwashing.

Figure 4:
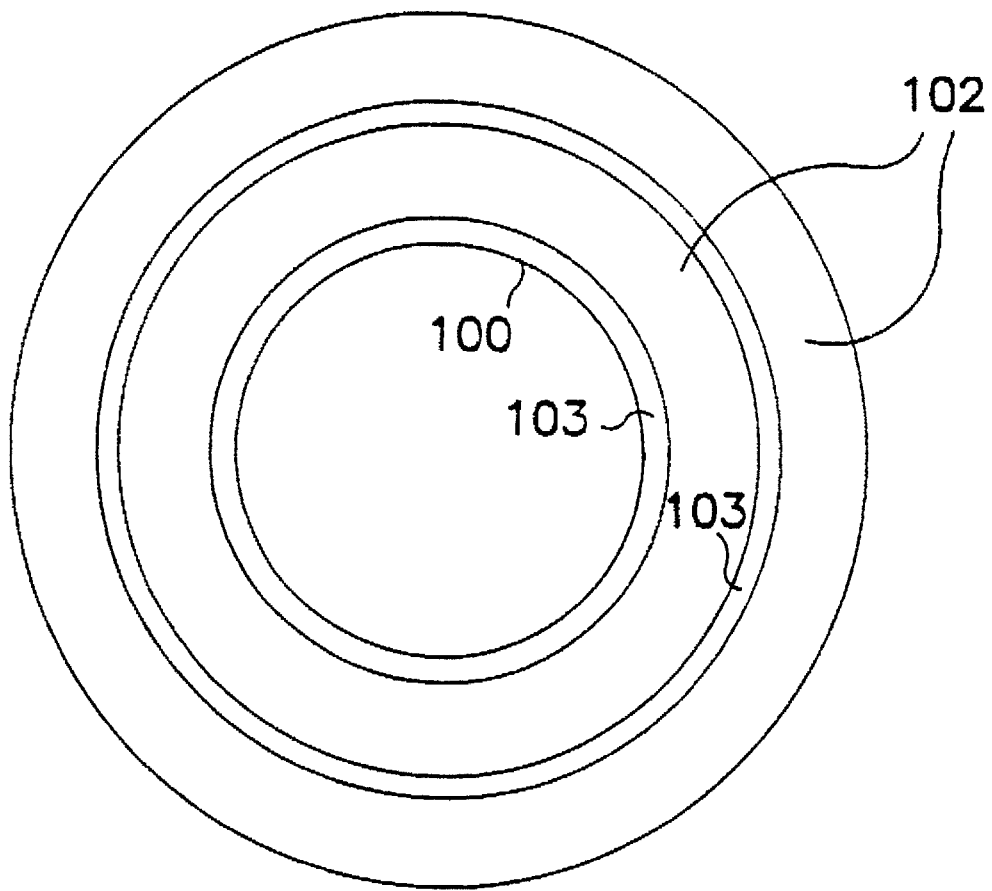
FIG. 4 is a cross-sectional representation of the filter element of FIG. 2

A cross-sectional view of the filter element 18 is illustrated in FIG. 4. The filter medium 102 is preferably constructed from at least two layers, and preferably, a plurality of layers of polyaramid fiber webbing which are helically wrapped around the core 100, each layer having a fiber and pore size determined by its upstream or downstream proximity. For example, each layer of the filter medium 102 may have a constant pore size and successive downstream layers may have successively smaller pore sizes. Interposed between the core 100 and the filter medium 102, and between adjacent layers of the polyaramid fiber webbing are diffusion layers 103.

The diffusion layers 103 may be of any suitable material and configuration which allow for, and preferably assist in, the lateral or edgewise flow of the edible oil within the filter element 18 between the inner most filter medium 102 layer and the core 100, and/or between adjacent filter medium 102 layers. Such a lateral flow assists in minimizing the pressure drop across the filter element 18. When the diffusion layer 103 is positioned between the core 100 and the innermost filter medium 102 layer, the diffusion layer 103 facilitates the passage of edible oil through the previous core 100, which will typically be of a perforated or fenestrated construction with a multitude of holes, and the innermost filter medium 102 layer by maximizing the use of the filter medium 102 surface area through which the edible oil can flow with equal ease beyond those portions of the filter medium 102 in close proximity to the holes of the core 100 through which edible oils will flow. When the diffusion layer 103 is positioned between adjacent filter medium 102 layers, the diffusion layer 103 similarly maximizes the use of the filter medium 102 surface area for filtration. The diffusion layer 103 also acts as a reservoir for accommodating particulate matter, i.e., bleaching clay and nickel catalyst, which provides for a relatively high dirt capacity, for the filter element 18. The diffusion layer 103 is porous so as not to interfere with the flow of edible oil, and so as not to substantially contribute to the pressure drop across the filter element 18.

A desirable diffusion layer 103 will generally be of a wire mesh, such as of stainless steel, particularly in high temperature environments, or will be a woven or non-woven web prepared from coarse fibers, preferably of the same material used in the filter medium 102, such as a polyaramid, having a high loft. The diffusion layer 103 utilized between the core 100 and the innermost filter medium 102 layer may be of one material such as stainless steel, while the diffusion layer 103 interposed between adjacent layers of filter medium 102 may be of a second material such as polyaramid fibers. The diffusion layer 103 is preferably made of a material which is structurally and chemically compatible with the core 100, the filter medium 102 and the edible oil. Generally, the diffusion layer will have a high voids volume and a low edge-wise flow resistance.

The filter medium 102 layers may be helically wrapped such that the edges of the filter medium 102 layers are abutting or overlapping. The overlapping of the filter medium 102 within a layer is preferred in that as the effective thickness of filter media is thereby increased, and edible oil flow pathways which bypass the filter medium 102 are minimized. The amount of overlapping may vary from 0% to as much as about 95%, preferably about 25 to 75%, and most preferably about 50% of the width of the filter medium 102 web. An overlap of about 67% will effectively triple the filter medium 102 thickness in each layer, while and overlap of about 50% will effectively double the filter medium 102 thickness of the filter element 18. U.S. Pat. No. 5,290,446, assigned to the same assignee as the present invention provides a complete description of helically wrapped filter elements, including a detailed description of the construction and use of diffusion layers.

In the exemplary embodiment, a polyaramid fiber is used to fabricate the filter medium 102 because of its ability to withstand the higher temperatures associated with edible oil processing. However, other materials may also be utilized. The filter medium 102 may be prepared from any suitable organic materials, such as nylon, aramid, fluoropolymer, polypropylene, polyethylene, polyester, polystyrene, and polyurethane resin, or from inorganic materials such as glass, carbon, stainless steel, and aluminum. Some of these materials are suitable for lower temperature applications and some of these materials are suitable for higher temperature applications. Combinations of various materials may also be utilized.

In addition to alternate materials, the structure of the filter medium 102 may be constructed in a different manner and geometry. For example, the filter medium 102 may include a mass of fibers, fibrous mats, porous membranes, such as supported or non-supported microporous membranes formed, e.g., from a polymeric material, porous foam and porous metals or ceramics. Alternatively, the filter medium may be of a pleated structure, as disclosed, for example, in International Publication No. WO 94/11082.

Figure 5:
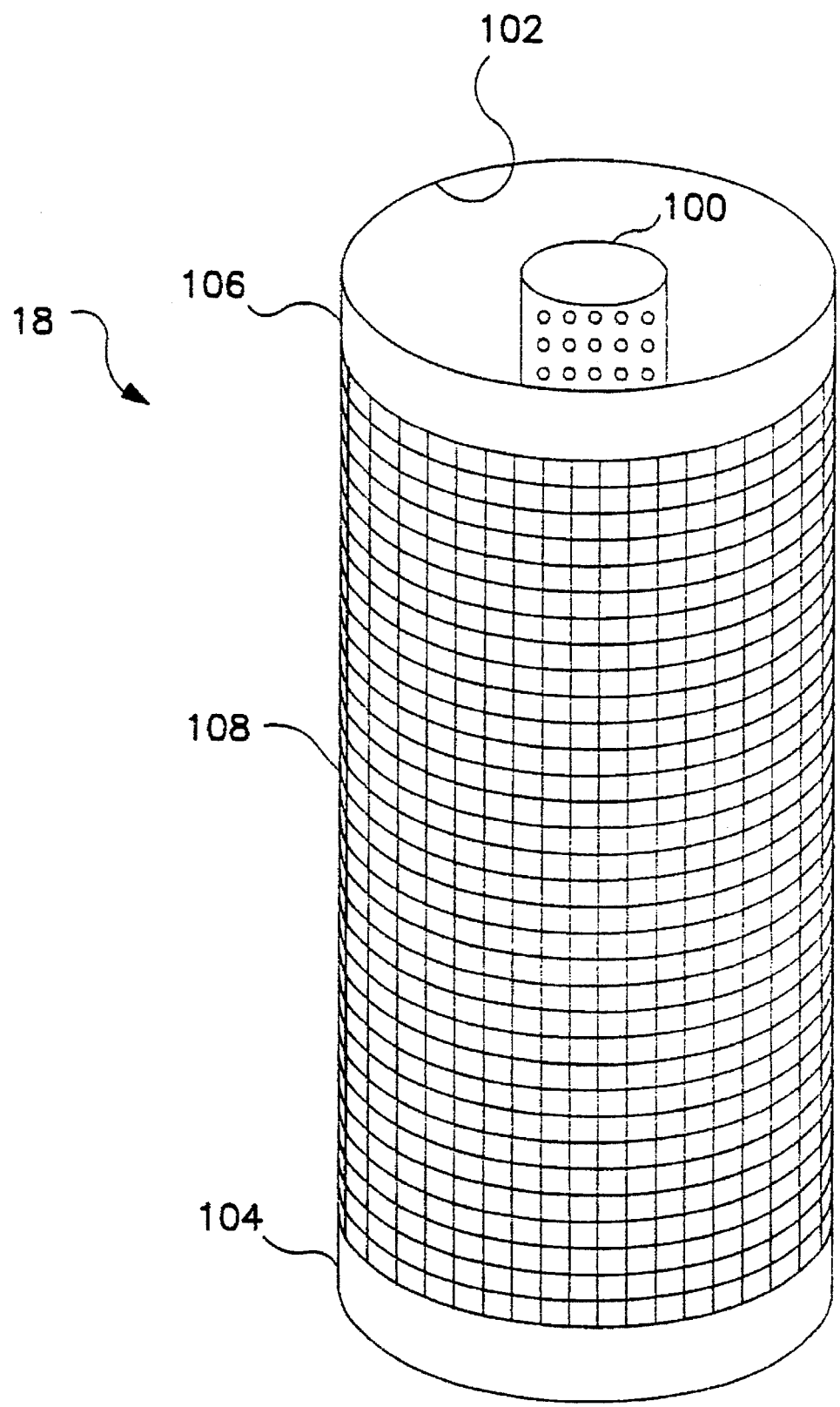
FIG. 5 is a diagrammatic representation of the filter element of FIG. 2 having a mesh outer winding.

A stainless steel mesh 108, illustrated in FIG. 5, may be wound helically around the filter medium 102 in order to provide a uniform, smooth outer surface for the effective release of collected solids during backwash. In addition, the stainless steel mesh 108 provides structural support for the porous filter medium 102 against outwardly directed forces. Added support may be particularly advantageous due to the repeated filtering/backwashing cycles of operation.

The filter element 18 may be made to any size to fit particular system requirements, including outer diameters from one inch or less to two inches or more. The porous filter medium may have any suitable removal rating. The filter medium 102 is preferably microporous. For example, it may have an absolute rating in the range from about 0.1 micron or less to about 20 microns or more.

During filtration, all of the valves except the edible oil feed valve 26 and the filtrate discharge valve 40 are typically closed. The processed edible oil to be filtered is introduced into the first chamber 14 through the edible oil feed pipe 20 and is passed generally radially through the hollow filter elements 18 to become filtrate. As the processed oil containing particles of, for example, bleaching clay and nickel catalyst passes through each filter element 18, particulate solids are deposited on the filter element 18, accumulating a cake of particulates directly on the filter element. The filtrate which passes through the filter medium 102 then passes along the hollow interior of each of the filter elements 18, through the openings 48 in the partition 12 and into the second chamber 16. The filtrate then exits the second chamber 16 through the filtrate discharge pipe 32 and may be collected in a reservoir not shown. Usually, during filtration, the first chamber 14 will be completely filled with the processed edible oil containing particulates such as bleaching clay or nickel catalyst, and the second chamber 16 will be completely filled with filtrate. Essentially, during the filtration process, the volume of the filter assembly is preferably filled with unfiltered fluid and filtrate and no gases such as air. Higher filtering efficiency of the edible oil is achieved when the gas volume is reduced.

The accumulation of a cake of particulates directly on each filter element 18 supplements the filtration action of the filter medium in the filter element 18 and ensures that virtually all of the particulate matter is removed from the processed edible oil. Depending on the size of the particulate matter and the removal rating of the filter elements 18, some of the particulate matter may pass with the filtrate through the filter elements 18 until a sufficient cake of accumulated particulates has been deposited directly on the filter elements 18. Consequently, it may be preferable to recirculate the filtrate back to the first chamber 14 until the cake of particulates has sufficiently accumulated on the filter elements 18 to remove virtually all of the particulate matter from the processed edible oil. Recirculation of the filtrate would be performed when the filter element 18 is clean. Of course, if the removal rating of the filter medium is sufficiently fine to remove an appropriate amount of the particulate matter from the edible oil without the accumulation of a cake on the filter elements 18, recirculation may be unnecessary.

For a period of time, the cake of particulate matter on the filter elements 18 is beneficial in that it enhances the filtration action of the filter element 18. However, once the buildup of particulate matter begins to excessively inhibit flow through and/or unduly increase the pressure drop across the filter elements 18, the filter elements 18 are fouled. After the filter elements 18 are fouled by the cake of particulates, including the bleaching clay and nickel catalyst, the filter elements 18 are cleaned by backwashing. Generally, in filtering edible oils, the particle load is not too high and the filter assembly may be backwashed in the range from about every half hour to about two hours. Of course, depending on the particle load, the filter assembly may be backwashed more often than once every half hour or less often than once every two hours.

During backwashing, the edible oil feed valve 26 and the filtrate discharge valve 40 are closed to cut off the supply of edible oil through the feed pipe 20 and the exit of filtrate through the filtrate discharge pipe 32. The lower drain valve 28 may remain closed and the edible oil may remain in the first chamber 14. Alternatively, in order to minimize the fluid forces which must be overcome during backwashing, the first chamber 14 is preferably drained so that the edible oil in the first chamber 14 is at or below the bottoms of the filter elements 18. For example, the lower drain valve 28 and the make-up gas feed valve 24 may be opened so the first chamber 14 is partially or completely drained of the edible oil through the lower drain pipe 22. The drained first chamber 14 may be maintained at atmospheric pressure, or it may be pressurized to a value just below the bubble point of the porous filter medium 102 of the filter elements 18. Pressurizing the first chamber 14 is done in order to impede the flow of filtrate within the cores 100 of the filter elements 18 through the filter elements 18 and into the first chamber 14 prematurely as is explained below. The drained first chamber 14 may be pressurized to a value of at least about seventy-five percent of the bubble point or, more preferably, of at least about ninety percent of the bubble point.

The second chamber 16 preferably remains full of filtrate, which may be used as the backwash liquid, or the second chamber 16 may be drained of filtrate to a specific desired level by means of the upper drain valve 42 and the upper drain pipe 34 and used as the backwash liquid. Alternatively, the filtrate may be completely drained from the second chamber 16 and a backwash liquid may be introduced into the second chamber 16 via the backwash feed pipe 38 and the backwash feed valve 46. The backwash liquid may be any fluid which is compatible with the filter elements 18 and the edible oil. Further, the backwash liquid may be treated in various ways, for example, by heating it or shifting the pH.

In a preferred embodiment, the backwash would be a gas assisted backwash utilizing the filtrate as the backwash medium. After the edible oil is drained to an appropriate level in the first chamber 14, the lower drain valve 28 is closed. With the valves 26 and 28 closed and the second chamber 16 containing the backwash fluid, both the first chamber 14 and the second chamber are pressurized, for example, via the pressurized gas feed pipe 36 and the gas feed valve 44 in the second chamber 16 and the make-up gas feed pipe 24 and valve 30 in the first chamber 14. The first chamber 14 is pressurized as described above and the second chamber 16 is pressurized to any suitable backwash pressure, for example, to about seventy to ninety psi. With both chambers 14 and 16 pressurized and the backwash liquid accumulated in the interiors of the filter elements 18 and the second chamber 16, the lower drain valve 28 is opened, venting the first chamber 14 directly through the lower drain pipe 22, and venting the second chamber 16 through the lower drain pipe 22 via the filter elements 18. This pressure pulse forces the backwash liquid and the gas in the second chamber 16 through the filter elements 18, dislodging the particulate cake from each filter element 18 and cleaning each filter element 18 of particulate matter. In particular, the increased pressure in the second chamber 16 causes a pressure pulse to abruptly force the backwash liquid accumulated above and in the interiors of the filter elements 18 to flow in the reverse direction through the filter elements 18 when the drain valve 28 is opened. The force of the outwardly flowing backwash liquid dislodges the particulate matter trapped in or on the outer surface of the filter elements 18, and the matter is blown out from the filter elements 18 together with the backwash liquid. The backwash liquid forced through the filter elements 18 and the particulate matter may be removed via the lower drain pipe 22, or if the lower drain valve 28 is closed, it may collect on the bottom of the first chamber 14.

Backwashing may be continuous, flushing all of the backwash liquid contained in the second chamber 16 through the filter elements 18 in one continuous stream, or discontinuous. For example, after a predetermined period of time or after a predetermined amount of backwash liquid has been flushed through the filter elements 18, the lower drain valve 28 may then be closed, allowing any backwash liquid in the second chamber 16 to fill into the interiors of the filter elements 18. The first and second chambers 14 and 16 are then repressurized and another backwashing cycle may be initiated. Similar backwashing cycles may be continued as long as there is sufficient backwashing liquid in the second chamber 16 or as long as backwashing liquid is supplied to the second chamber 16.

The filter assembly of the present invention may be equipped with any suitable mechanism for automatically determining when the backwash liquid is at a suitable level, such as a level sensor disposed in the housing 10 or a timer. The level of the backwash liquid in the second chamber 16 will depend upon many factors, including the size of the filter elements 18 and the amount of backwashing liquid which it is desired to flush through the filter elements 18. For some embodiments, the level of the backwash liquid may be selected so that the volume of the backwash liquid ranges from about one to about ten times the total volume of the interiors of all of the filter elements 18. The pressurized gas provides the energy for backwashing, and any gas which is compatible with the filter assembly, the backwashing liquid, and the edible oil may be used. Frequently, compressed air or nitrogen is used.

The characteristics of the reverse pressure pulse, e.g., the magnitude of the differential pressure between the second and first chambers 16 and 14 and the duration of the pulse, may vary depending on such factors as the ability of the filter elements 18 to withstand reverse pressure differentials and the desired reverse flow velocity for cleaning the filter elements 18.

Figure 6:
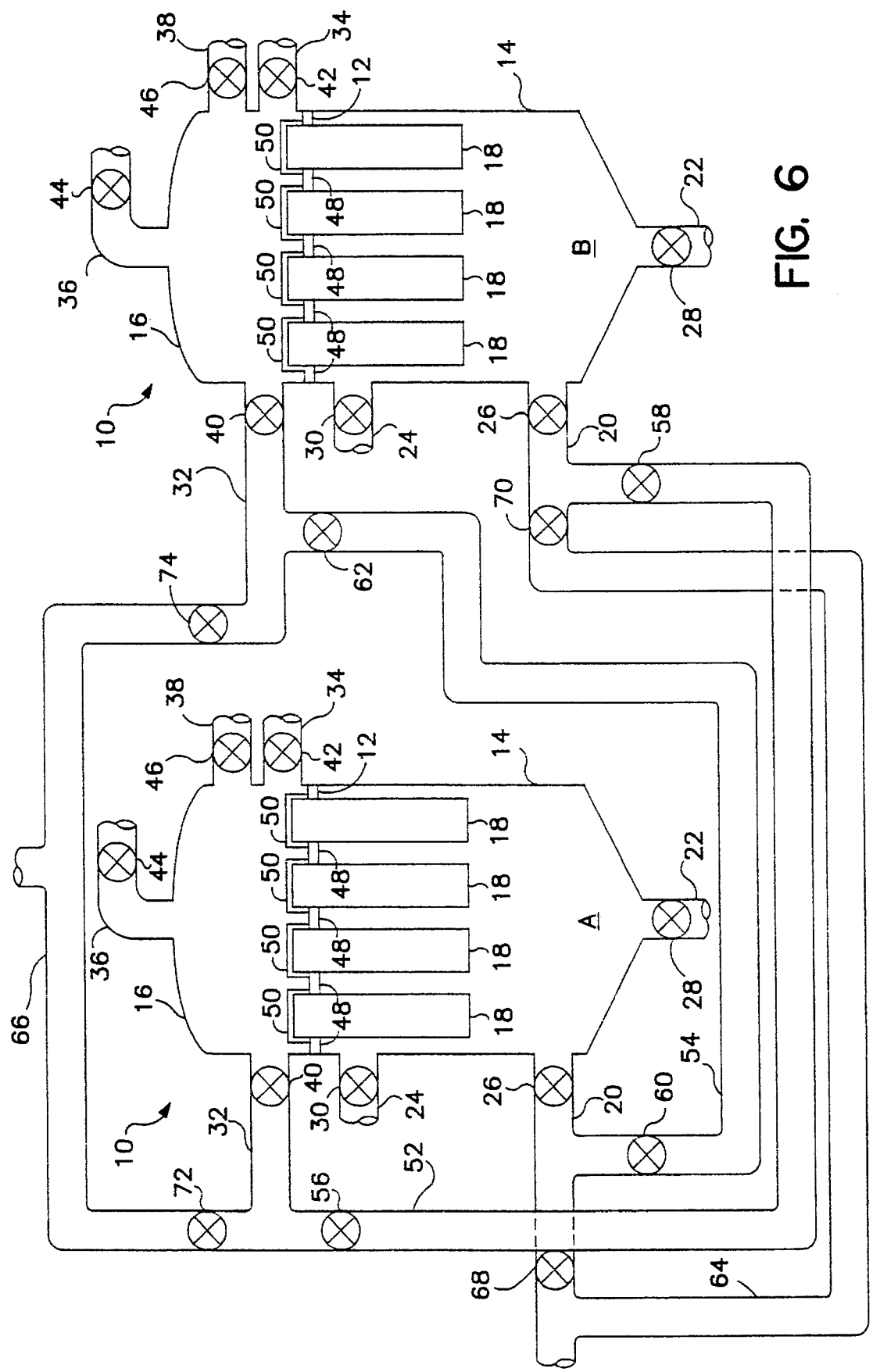
FIG. 6 is a cross-sectional view of two backwashable, edible oil filter assemblies of the present invention connected in series and tandem.

In accordance with another aspect of the invention, a multi-assembly backwash filtration system may be used to implement the methodology of the present invention. FIG. 6 is a cross-sectional view of two backwashable filter assemblies connected in a series and tandem arrangement. Each of the filter assemblies may be identical to the one illustrated in FIG. 1; accordingly, identical elements are labelled with identical reference numerals. The two filter assemblies, designated as assembly A and assembly B, respectively, of the backwash filtration system are preferably operated in a series and tandem arrangement. The two filter assemblies A, B may be connected in a tandem arrangement such that generally when one filter assembly is in the filtering mode, the second filter assembly is in the backwashing mode. In addition, the two filter assemblies A, B may be connected in a series arrangement to aid in the filtering process. As previously discussed, the removal rating of the filter elements 18 may not be sufficiently fine to remove substantially all of the particulate matter, especially the nickel catalyst, until a sufficient cake of particulate matter has built up on the filter elements 18. Thus, once a filter assembly is placed in the filtering mode of operation with clean filter elements 18, some of the nickel catalyst may pass through the filter elements 18 until a cake of particulate matter, including bleaching clay and nickel catalyst, forms directly on the filter elements 18. Accordingly, operating the filter assemblies in a series arrangement for a period of time solves the problem. For example, the filter elements 18 in one filter assembly, e.g. assembly A, may be caked, e.g., by recirculation. Recirculation of the filtrate would be performed when the filter elements 18 are clean. Once a cake has accumulated on the filter elements 18 of filter assembly A, the edible oil to be filtered may be directed in a single pass through the filter assembly A, where the nickel catalyst and bleaching clay are removed by the caked filter elements 18 until it is time to backwash the filter elements 18 of the filter assembly A. The flow of edible oil to be filtered is then switched to the second filter assembly B, having clean filter elements 18, and filter assembly B is connected in series to filter assembly A, having caked filter elements 18. The flow of oil would then proceed first through the clean filter elements 18 of filter assembly B and some of the particulate matter might pass through the clean filter elements 18 and end up in the filtrate. However, the two filter assemblies A and B are connected in series with assembly A downstream of assembly B, and thus the filtrate oil exiting filter assembly B, which is currently in the filtering mode of operation would be passed through filter assembly A, which already has a cake built-up on the filter elements 18 from immediately prior filtering mode and thus will completely remove the particulate matter from the oil. Once the filter elements 18 in the second filter assembly B have built up a sufficient cake of particulate matter to completely remove all of the particulates from the edible oil, filtration could proceed through filter assembly B only and the other filter assembly A could be backwashed to clean the caked filter elements 18 of the first filter assembly A. Filtration in one assembly and backwashing in the second assembly may be referred to as operation in a tandem arrangement.

The process is completely cyclic. Once the cake builds up enough to foul the filter elements 18 in the filter assembly currently filtering the oil, the flow of oil is directed first through the other filter assembly having clean filter elements 18 and then in series through the filter assembly having caked filter elements. After the clean filter elements 18 of the one filter assembly build up a cake sufficient to remove the particulates, the filter assemblies are decoupled in a tandem arrangement and the other filter assembly is backwashed. In the exemplary embodiment illustrated in FIG. 6, the two filter assemblies A and B are connected in a series arrangement or tandem arrangement by four pipes 52, 54, 64, and 66. Pipe 52 is connected between the filtrate discharge pipe 32 of the first filter assembly A, on one end, and edible oil feed pipe 20 of the second filter assembly B on the second end thereof. One or more control valves 56 and 58 control the flow of fluid through pipe 52. Pipe 54 is connected between the filtrate discharge pipe 32 of the second filter assembly B, on one end, and into the edible oil feed pipe 20 of the first filter assembly A, on the second end thereof. One or more control valves 60 and 62 control the flow of fluid through pipe 54. Pipe 64 is connected between the edible oil feed pipes 20 of the first and second filter assemblies A and B, and to an edible oil supply (not illustrated). Control valves 68 and 70 control the flow of fluid through pipe 64. Accordingly, if control valve 70 is closed, control valve 60 closed, control valve 26 of filter assembly A open, and control valve 68 open, the edible oil from the supply flows through the edible oil feed pipe 20 and into filter assembly A. If, however, control valve 68 is closed, control valve 58 closed, control valve 26 of filter assembly B open, and control valve 70 open, the edible oil from the supply flows through the edible oil feed pipe 20 and into filter assembly B. Pipe 66 is connected between the filtrate discharge pipes 32 of the first and second filter assemblies A and B, and to a filtrate collection tank (not illustrated). Control valves 72 and 74 control the flow of fluid through pipe 66. Accordingly, if control valve 40 of filter assembly A and control valve 72 are open and control valves 56 and 74 are closed, then the filtrate flows from filter assembly A to the filtrate collection tank. If, however, control valve 74 and control valve 40 of filter assembly B are open, and control valves 62 and 72 are closed, then the filtrate flows from filter assembly B to the filtrate collection tank. The control valves 56, 58, 60, 62, 68, 70, 72, and 74 utilized in conjunction with interconnection pipes 52, 54, 64, and 66 may be manually or automatically operated and may be any suitable type of valve such as a gate valve.

Assuming that the filter elements 18 of filter assembly A have a sufficient cake deposited thereon, filtration may proceed solely in filter assembly A. Filtration may proceed solely in filter assembly A by closing control valves 70, 58, 62, 60, 74, and 56 and control valves 26 and 40 of filter assembly B and opening control valves 68 and 72 and control valves 26 and 40 of filter assembly A. Filter assembly A continues to process the edible oil until a point prior to the time that the filter elements 18 require backwashing. This point in time may be a predetermined time or may be a predetermined pressure build-up. Once this point in time or pressure is reached, control valves 68, 58, 74, and 56 are closed and control valves 70, 62, 60, and 72 and control valves 26 and 40 of filter assemblies A and B are opened. The edible oil from the supply may flow through pipe 64 to filter assembly B. Since the filter elements 18 of filter assembly B are clean, i.e., no cake deposited thereon, the filtration of the edible oil may not be sufficiently effective because, as discussed previously, the removal rating of the filter elements 18 may not be sufficiently fine to remove substantially all of the particulate matter until a sufficient cake of particulate matter has built up on the filter elements 18. Accordingly, the filtrate exiting from filter assembly B through the filtrate discharge pipe 32 may be ported in a series arrangement to filter assembly A for additional filtration. The filtrate from filter assembly B flows from the outlet of filter assembly B through pipe 54 and into the inlet of filter assembly A for additional filtration. Since the filter elements 18 of filter assembly A are caked, the filtration may be completed in filter assembly A. Filtrate exiting filter assembly A through filtrate discharge pipe 32 may flow through pipe 66 to the filtrate storage tank.

Once a cake is built up in the filter elements 18 of filter assembly B, control valves 68, 60, 58, 62, 72, and 56 and control valves 26 and 40 of filter assembly A may be closed and control valves 70 and 72 and control valves 26 and 40 of filter assembly B may be opened, thereby porting the filtrate exiting filter assembly B directly to the filtrate storage tank through pipe 66. The two filter assemblies A and B are now decoupled in a tandem arrangement. Filtration may now proceed solely in filter assembly B; accordingly, the filter elements 18 of filter assembly A may be backwashed.

When the filter elements 18 of filter assembly B reach the point in time prior to the time that they require backwashing, control valves 60, 70, 72, and 62 may be closed and control valves 68, 56, 58, and 74 and control valves 26 and 40 of filter assemblies A and B may be opened, thereby directing the flow of edible oil from the supply into filter assembly A and in series into filter assembly B. Since the filter elements 18 of filter assembly A have been backwashed and are clean, the filtration may not be complete for the reasons described above. Accordingly, the filtrate exiting filter assembly A is ported in a series arrangement to filter assembly B wherein the filter elements 18 have a sufficient cake to complete the filtration.

Once a sufficient cake is built up on the filter elements 18 of filter assembly A, the control valves may be set as previously indicated to allow filtration to proceed solely in filter assembly A. The two filter assemblies A and B are now decoupled in a tandem arrangement. The filtrate exiting from filter assembly A may be ported via pipe 66 to the filtrate storing tank and filter assembly B may be backwashed.

The filtration process utilizing the above described series and tandem arrangements is cyclic and may be continued indefinitely without interruption due to the ability of backwashing and filtering simultaneously.

A filter assembly or system and a backwashing method embodying the present invention are highly effective. The backwashing method decreases the flow resistance of the filter elements 18 by removing accumulated particulate and colloidal matter which can foul the porous filter medium, as a result of which the efficiency of the filter assembly can be increased. The filter assembly and backwashing method embodying the present invention substantially reduces waste, and reduces cost, while increasing process rates. In prior art systems for the filtering of edible oils, the filter elements require a precoat. Accordingly, during backwash cycles, the precoat material is removed from the filter elements along with the collected particulate matter. In addition to the cost associated with replacing the precoat, the amount of waste is vastly increased due to the presence of the precoat. Since the filter elements of the present invention do not require a precoat, the waste is greatly reduced. The entire filtering process rate is increased due to the fact that no cycling is required to precoat the filter elements and because the filtering and backwashing cycles proceed in parallel. Therefore, the filtering cycle is continuous and uninterrupted. Also aiding in increasing the process rates is the use of the substantially cylindrical filter elements in a backwashing assembly. The design of the filter elements, as stated above, facilitates the removal of accumulated particulates during backwashing, thereby making backwashing quicker and more efficient.

Although shown and described is what is believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed:

1. A method of filtering edible oils comprising:
    (a) passing edible oil containing solid particulate matter into a backwashable filter assembly;
    (b) removing the solid particulate matter from the edible oil by directing the edible oil through a fibrous filter medium having a graded pore structure, including passing the edible oil through a coarser pore upstream region and then a finer pore downstream region of at least one substantially cylindrical filter element contained within the backwashable filter assembly and accumulating the solid particulate matter directly on the at least one substantially cylindrical filter element;
    (c) backwashing the at least one substantially cylindrical filter element after the cake of solid particulate matter accumulates on the at least one substantially cylindrical filter element by directing a backwash fluid through the fibrous filter medium having a graded pore structure, including passing the backwash fluid through the finer pore downstream region and then the coarser pore upstream region, to clean the at least one substantially cylindrical filter element having the solid particulate matter removed from the edible oil accumulated thereon; and
    (d) cyclically alternating between removing the solid particulate matter from the edible oil by passing the edible oil through the at least one substantially cylindrical filter element and backwashing the at least one substantially cylindrical filter element to clean the at least one substantially cylindrical filter element having solid particulate accumulated thereon.

2. The method of filtering edible oils according to claim 1, wherein directing the edible oil through the fibrous medium further includes directing the edible oil through at least two layers of fibers helically wrapped around a core of the at least one substantially cylindrical filter element.

3. The method of filtering edible oils according to claim 2, wherein directing the edible oil through the fibrous filter medium includes directing the edible oil through at least one diffusion layer disposed between the at least two layers of fibrous medium or between the core and the fibrous medium to facilitate edgewise flow of the edible oil.

4. The method of filtering edible oils according to claim 1, wherein the fibrous medium comprises polyaramid fibers.

5. The method of filtering edible oils according to claim 4, wherein the fibrous medium comprises Kevlar® fibers.

6. The method of filtering edible oils according to claim 1, wherein accumulating the solid particulate matter comprises trapping and sieving bleaching clay in the edible oil.

7. The method of filtering edible oils according to claim 1, wherein accumulating the solid particulate matter comprises trapping and sieving nickel catalyst in the edible oil.

8. The method of filtering edible oils according to claim 1, wherein backwashing the at least one substantially cylindrical filter element further includes pressurizing the backwashable filter assembly and opening a drain in the backwashable filter assembly thereby generating a pressure pulse that facilitates the removal of the cake of solid particulate matter.

9. The method of filtering edible oils according to claim 1, wherein directing the edible oil through the fibrous medium further includes directing the edible oil through at least two layers of polyaramid fibers helically wrapped around a core of the at least one substantially cylindrical filter element, the polyaramid fibers comprising Kevlar® fibers.

10. The method of filtering edible oils according to claim 9, wherein directing the edible oil through the fibrous filter medium includes directing the edible oil through at least one diffusion layer disposed between the at least two layers of fibrous media or between the core and the fibrous medium to facilitate edgewise flow of the edible oil.

11. The method of filtering edible oils according to claim 1, wherein accumulating the solid particulate matter comprises trapping and sieving bleaching clay and nickel catalyst in the edible oil.

12. A method of filtering edible oils comprising:
    (a) passing a fluid containing solid particulate matter into a first backwashable filter assembly and into a second backwashable filter assembly;
    (b) removing the solid particulate matter from the fluid by directing the fluid through at least one filter element in the first backwashable filter assembly, including accumulating a cake of the solid particulate matter on the at least one filter element in the first backwashable filter assembly, and through at least one filter element in the second backwashable filter assembly, including accumulating a cake of the solid particulate matter on the at least one filter element in the second backwashable filter assembly; wherein said at least one filter element in the first backwashable filter assembly and said at least one filter element in the second backwashable filter assembly comprises a fibrous filter medium having a graded pore structure, including passing the edible oil through a coarser pore upstream region and then a finer pore downstream region;

(c) backwashing the at least one filter element in the first backwashable filter assembly after the cake of solid particulate matter is formed on the at least one filter element of the second backwashable filter assembly; and (d) backwashing the at least one filter element in the second backwashable filter assembly after the cake of solid particulate matter is formed on the at least one filter element of the first backwashable filter assembly.

13. The method of filtering fluids according to claim 12 wherein directing the fluid through the fibrous medium includes directing the fluid through at least two layers of fibers helically wrapped around a core of the at least one substantially cylindrical filter element.

14. The method of filtering fluids according to claim 13, wherein the fibrous medium comprises polyaramid fibers.

15. The method of filtering fluids according to claim 12, wherein backwashing the at least one filter element in the first and second backwashable filter assemblies includes directing a backwash liquid through the fibrous filter medium having a graded pore structure, including passing the backwash fluid through the finer pore downstream region and then the coarser pore upstream region.

16. The method of filtering fluids according to claim 15, wherein backwashing the at least one filter element in the first and second backwashable filter assemblies further includes pressurizing the backwashable filter assemblies and opening a drain in each of the backwashable filter assemblies thereby generating a pressure pulse that facilitates the removal of the cake of solid particulate matter.

17. A method of filtering edible oil fluids comprising:

(a) passing an edible oil fluid containing solid particulate matter into an inlet of a first backwashable filter assembly;

(b) removing the solid particulate matter from the fluid by directing the fluid through the at least one filter element in the first backwashable filter assembly, including building a cake of the solid particulate matter on the at least one filter element in the first backwashable filter assembly;

(c) discontinuing passing of the fluid containing solid particulate matter into the inlet of the first backwashable filter assembly;

(d) passing the fluid containing solid particulate matter into an inlet of a second backwashable filter assembly through an outlet of the second backwashable filter assembly and into the inlet of the first backwashable filter assembly;

(e) removing the solid particulate matter from the fluid by directing the fluid through the at least one filter element in the second backwashable filter assembly, including accumulating a cake of the solid particulate matter on the at least one filter element in the second backwashable filter assembly, and through the at least one filter element in the first backwashable filter assembly, and through the cake of the solid particulate matter on the at least one filter element in the first backwashable filter assembly;

(f) discontinuing passing the fluid from the outlet of the second backwashable filter assembly to the inlet of the first backwashable filter assembly;

(g) backwashing the at least one filter element in the first backwashable filter assembly;

(h) discontinuing passing of the fluid containing solid particulate matter into the inlet of the second backwashable filter assembly;

(i) passing the fluid containing solid particulate matter into an inlet of the first backwashable assembly through the outlet of the first backwashable filter assembly and into the inlet of the second backwashable filter assembly;

(j) removing the solid particulate matter from the fluid by directing the fluid through the at least one filter element in the first backwashable filter assembly, including accumulating a cake of the solid particulate matter on the at least one filter element in the first backwashable filter assembly, and through the at least one filter element in the second backwashable filter assembly, including accumulating a cake of the solid particulate matter on the at least one filter element in the second backwashable filter assembly;

(k) discontinuing passing the fluid from the outlet of the first backwashable filter assembly; and (l) backwashing the at least one filter element in the second backwashable filter assembly.

18. The method of filtering fluids according to claim 17, wherein directing the fluid through at least one filter element in the first backwashable filter assembly comprises directing the fluid through a fibrous filter medium having a graded pore structure, including passing the fluid through a coarser pore upstream region and then a finer pore downstream region.

19. The method of filtering fluids according to claim 18, wherein directing the fluid through the fibrous medium includes directing the fluid through at least two layers of fibers helically wrapped around a core of the at least one substantially cylindrical filter element.

20. The method of filtering fluids according to claim 19, wherein the fibrous medium comprises polyaramid fibers.

21. The method of filtering fluids according to claim 17, wherein directing the fluid through at least one filter element in the second backwashable filter assembly comprises directing the fluid through a fibrous filter medium having a graded pore structure including passing the fluid through a coarser pore upstream region and then a finer pore downstream region.

22. The method of filtering fluids according to claim 21, wherein directing the fluid through the fibrous medium includes directing the fluid through at least two layers of fibers helically wrapped around a core of the at least one substantially cylindrical filter element.

23. The method of filtering fluids according to claim 22, wherein the fibrous medium comprises polyaramid fibers.

24. The method of filtering fluids according to claim 17, wherein backwashing the at least one filter element in the first and second backwashable filter assemblies includes directing a backwash liquid through the fibrous filter medium having a graded pore structure, including passing the backwash fluid through the finer pore downstream region and then the coarser pore upstream region.

25. The method of filtering fluids according to claim 24, wherein backwashing the at least one filter element in the first and second backwashable filter assemblies further includes pressurizing the backwashable filter assemblies and opening a drain in each of the backwashable filter assemblies thereby generating a pressure pulse that facilitates the removal of the cake of solid particulate matter.

* * * * *